United States Patent [19]

Sakai et al.

[11] Patent Number: 4,975,213

[45] Date of Patent: Dec. 4, 1990

[54] RESIN-BONDED RARE EARTH-IRON-BORON MAGNET

[75] Inventors: Isao Sakai; Akihiko Tsutai; Masashi Sahashi; Tetsuhiko Mizoguchi; Koichiro Inomata, all of Kanagawa, Japan

[73] Assignee: Kabushiki Kaisha Toshiba, Kawasaki, Japan

[21] Appl. No.: 294,124

[22] Filed: Jan. 6, 1989

[30] Foreign Application Priority Data

| | | | |
|---|---|---|---|
| Jan. 19, 1988 | [JP] | Japan | 63-7526 |
| Mar. 2, 1988 | [JP] | Japan | 63-47416 |
| Aug. 31, 1988 | [JP] | Japan | 63-214860 |
| Sep. 22, 1988 | [JP] | Japan | 63-238018 |

[51] Int. Cl.[5] .......... C04B 35/64

[52] U.S. Cl. .......... 252/62.53; 252/62.54; 148/302; 420/83; 420/121

[58] Field of Search .......... 148/301, 302; 420/83, 420/121; 75/244; 252/62.53, 62.54

[56] References Cited

U.S. PATENT DOCUMENTS

| | | | |
|---|---|---|---|
| 4,836,868 | 6/1989 | Yajima et al. | 148/302 |
| 4,842,656 | 6/1989 | Maines et al. | 148/302 |

FOREIGN PATENT DOCUMENTS

| | | | |
|---|---|---|---|
| 0187538 | 7/1986 | European Pat. Off. | 148/302 |
| 0242187 | 10/1987 | European Pat. Off. | 148/302 |
| 59-219904 | 12/1984 | Japan . | |
| 60-194502 | 10/1985 | Japan | 148/302 |
| 62-102504 | of 1987 | Japan . | |

OTHER PUBLICATIONS

Materials Letters, vol. 4, No. 5.6.7, Jul. 1986, pp. 304 to 306.

IEEE Transactions on Magnetics, vol. Mag-23, No. 5, Sep. 1987, pp. 2512-2514.

*Primary Examiner*—John P. Sheehan

*Attorney, Agent, or Firm*—Cushman, Darby & Cushman

[57] ABSTRACT

In a method for producing a resin-bonded rare earth-iron-boron magnet, a powder is subjected to a heat-treatment below its melting point. The powder can be either: (1) a mixture of both: (a) a powder of a rare earth-iron-boron magnetic alloy comprising about 8 to about 30 atomic percent of R, which stands for at least one selected from the group of Y (yttrium) and rare earth elements, about 2 to about 28 atomic precent of B(boron), and at least 50 atomic percent of Fe(iron) and (b) at least one of the group consisting of R, R-oxides, which are oxides of R, and R-compound, which are the compounds consisting essentially of more than 30 atomic percent of R and the balance substantially of at least one of Fe and Co; or (2) a rare earth-iron-boron magnetic alloy comprising about 8 to about 30 atomic percent of R, about 2 to about 28 atomic percent of B, about 0.1 to about 13 atomic percent of Ga, and at least 50 atomic percent of Fe. The resultant heat-treatment powder is then bonded with a resin. The present invention also includes a magnet such as might be made by such a method.

19 Claims, 2 Drawing Sheets

RESIN-BONDED RARE EARTH-IRON-BORON MAGNET

BACKGROUND OF THE INVENTION

The present invention relates to a resin-bonded rare earth-iron-boron magnet and to a method of manufacturing thereof.

Rare earth magnets, particularly those containing rare earth and cobalt, such as $RCo_5$ and $R_2Co_{17}$, wherein R stands for at least one of yttrium and a rare earth element, have been known to the art. These permanent magnets, however, have energy products ((BH)max) approximately on the order of 30MGOe at most. And they require ample use of relatively expensive Co.

Therefore, relatively inexpensive rare earth-iron-boron magnets have been proposed in recent years to take the place of rare earth-cobalt magnets. Rare earth-iron-boron magnets are described in U.S. Pat. No. 4,597,938, U.S. Pat. No. 4,601,875, and U.S. Pat. No. 4,664,724, for example. They are composed of constituent elements of Nd, Fe and B. Such magnets are highly advantageous because they enjoy a reduction in cost due to the use of Fe and are producible with (BH)max exceeding 30MGOe.

Also, resin-bonded magnets, in which magnetic powder is bonded by resin, have an advantage in that they can be fabricated in a rich variety of shapes. Therefore, a resin-bonded rare earth-iron-boron magnet has been desired. A sintered magnet shows magnetic properties as a result of the overall sintered mass. However, a resin-bonded magnet requires that each particle of the powder has excellent magnetic properties, since the powder particles of a resin-bonded magnet are only bonded with a resin. Therefore, sintered magnet techniques can not simply be applied to a resin-bonded magnet.

Until this invention, the production of a resin-bonded magnet required the use of a powder obtained by melt-spinning, which is reported in European Patent Publications 108474, 125752 and 5 144112, for example. The magnet obtained by melt-spinning is naturally isotropic. However, a magnet desirably has anisotropic magnetic properties, because such a magnet can have a larger (BH)max than a magnet with isotropic properties. When a powder obtained by the melt-spinning method is used, an anisotropic resin-bonded magnet can be produced by the method comprising steps of:

(i) producing a powder by melt-spinning, wherein the powder has isotropic magnetic properties;
(ii) hot-pressing the resultant powder in a desired shape;
(iii) subjecting the hot-pressed body to hot plastic deformation thereby forming an anisotropic bulk;
(iv) pulverizing the bulk into an anisotropic powder; and
(v) bonding the anisotropic powder with a resin.

The melt-spinning method itself is complicated. Furthermore, for producing an anisotropic magnet, complicated steps such as (ii) and (iii) above are additionally needed. Therefore, an easy method for forming resin bonded magnets, to replace the melt-spinning method, has been sought. For example, a method using a casted alloy or a sintered alloy is reported in Japanese Patent Application Disclosures (KOKAI) 59-219904 and 62-102504 for example. However, use of a powder obtained by pulverizing a cast alloy or a sintered alloy has not yet been practical for resin-bonded rare earth-iron-boron magnets. This is because the magnetic powder used for the production of a resin-bonded magnet is required to have a particle size on the order of submillimeters. However, when pulverized to the level of submillimeters, the casted alloy or a sintered alloy suffers from a sharp drop of coercive force (iHc) as reported in Materials Letters: vol. 4 No. 5,6,7 (1986) 304. The coercive force may be improved to a certain extent by using a sintered alloy having an increased rare earth element content and subjecting the powder of the sintered alloy to an aging treatment. This procedure, however, has a disadvantage that the individual particles of the powder coalesce and the clusters resulting from the coalescence must be pulverized again, as reported in IEEE Trans. Magn. MAG-23 (1987) 2512. The pulverization so performed the second time degrades the coercive force again and induces deterioration of the rectangular property of the B-H hysteresis loop.

SUMMARY OF THE INVENTION

An object of the present invention is to provide a resin-bonded rare earth-iron-boron magnet which has excellent magnetic properties.

Another object of the present invention is to provide a method for easily producing a resin-bonded rare earth-iron-boron magnet without using the melt-spinning method.

A further object of the present invention is to provide a method for easily producing a resin-bonded rare earth-iron-bonded anisotropic magnet without using the melt-spinning method.

According to the present invention, in a method for producing a resin-bonded rare earth-iron-boron magnet, a powder is subjected to a heat-treatment below its melting point. The powder can be either: (1) a mixture of both: (a) a powder of a rare earth-iron-boron magnetic alloy comprising about 8 to about 30 atomic percent of R, which stands for at least one selected from the group of Y (yttrium) and rare earth elements, about 2 to about 28 atomic percent of B(boron), and at least 50 atomic percent of Fe(iron) and (b) at least one of the group consisting of R, R-oxides, which are oxides of R, and R-compound, which are the compounds consisting essentially of more than 30 atomic percent of R and the balance substantially of at least one of Fe and Co; or (2) a rare earth-iron-boron magnetic alloy comprising about 8 to about 30 atomic percent of R, about 2 to about 28 atomic percent of B, about 0.1 to about 13 atomic percent of Ga, and at least 50 atomic percent of Fe. The resultant heat-treatment powder is then bonded with a resin. The present invention also includes a magnet such as might be made by such a method.

According to the present invention, a resin-bonded rare earth-iron-boron magnet which is excellent in magnetic properties is provided.

DETAILED DESCRIPTION OF THE PREFERRED EMBODIMENTS

Figure 1:
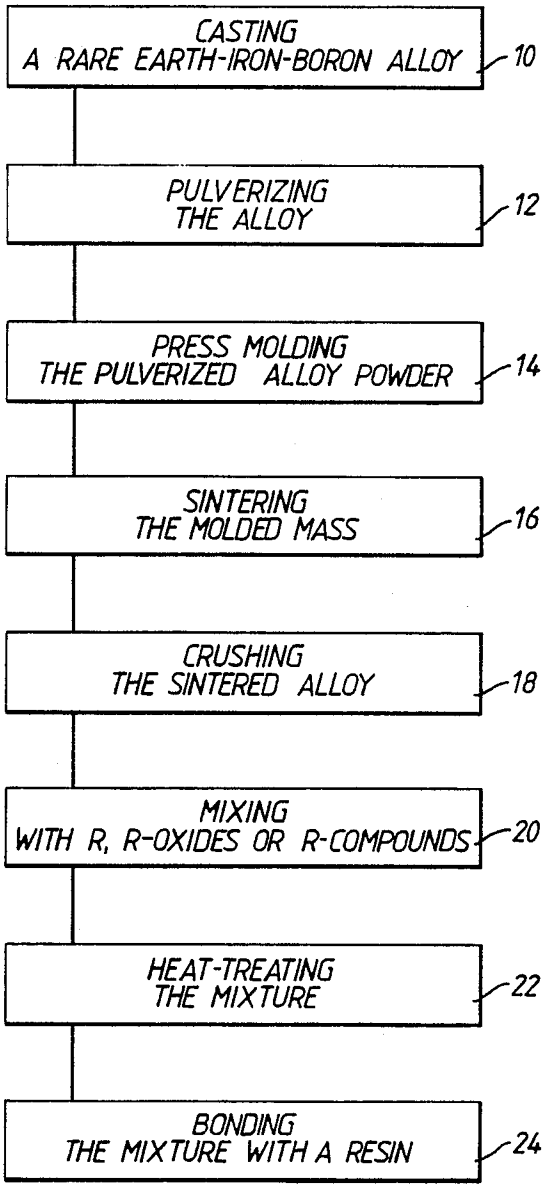
FIG. 1 shows a flowchart of the present invention.

The present invention will now be described in detail.

A rare earth-iron-boron magnetic alloy powder can have excellent magnetic properties such as high iHc if it receives a heat treatment with R, R-oxides or R-compound. In this application R is at least one selected from the group of yttrium (Y) and rare earth elements. Especially R-oxides are effective, because when a rare earth-iron-boron magnetic alloy powder is subjected to a heat treatment with R-oxides, the rare earth-iron-boron magnetic alloy powder is prevented from coalescing. R or R-compounds are effective to improve iHc and the rectangular property of the B-H hysteresis loop. It is considered that the effect of R or R-compounds may remedy defects such as strain by covering the surface of the powder with a phase richly containing a rare earth element. R-oxides may behave the same as R or R-compounds. Therefore R or R-compounds are preferably used with R-oxides. The lower limit of the R content of the R-compounds is 30 atomic percent, because the aforementioned effects is not satisfactorily manifested when the R content is less than the lower limit. Preferably the balance of the R-compound is at least one of Fe and Co. The Fe and Co in the R-compound may be substituted with transition metals, alkaline earth elements or aluminum. Also the R-compound may include impurities. Also the content of the R, R-oxides and R-compounds is preferably from about 0.1% to about 30% by weight based on the rare earth-iron-boron magnetic alloy powder. If the content is less than 0.1%, the effect of the R, R-oxides and R-compounds is not easily obtained and if the content exceeds 30%, the residual magnetic flux density (Br) of the resin-bonded magnet possibly falls. Furthermore the content of the R, R-oxides and R-compounds is more preferably in the range of about 1% to about 20% by weight. Moreover, it is preferable to include at least 0.1% by weight of R-oxides and at least 0.1% by weight of either R or R-compounds.

The rare earth-iron-boron magnetic alloy is comprised of about 8 to about 30 atomic percent of R, about 2 to about 28 atomic percent of B (boron), and at least 50 atomic percent of Fe(iron).

If the content of R is less than 8 atomic percent, the coercive force (iHc) deteriorates. Conversely, if the R content exceeds 30 atomic percent, the residual magnetic flux density (br) deteriorates. Thus, (BH)max is impaired when a deviation occurs in either direction from the specified range. Preferably, the R content is in the range of about 12 to about 20 atomic percent. Among the rare earth elements, Nd and Pr are particularly effective in enhancing magnetic properties such as (BH)max. The magnetic alloy preferably contains at least one of Nd and Pr. The content of Nd and Pr is preferably not less than 70%, more preferably 100% of the R content of the magnetic alloy.

If the content of boron (B) is less than 2 atomic percent, the rectangular property of the B-H hysteresis loop is deteriorated. If the boron content exceeds 28 atomic percent, magnetic properties, such as Br, deteriorate. For high coercive force, the boron content is preferably at least 5.5 atomic percent. Optionally, C, N, Si, P, or Ge may be used as a substitute for up to 80 atomic percent of B.

The constituent elements of the rare earth-iron magnetic alloy include Fe in addition to R and B mentioned above. The content of Fe should be at least 50 atomic percent. If the Fe content is less than 50 atomic percent, the property of Br deteriorates. Optionally, aluminum (Al) and gallium (Ga) may be used as substitutes for part of the Fe. The elements of Al and Ga are effective in enhancing the coercive force. For producing a magnet having a sufficiently high iHc, the content of Al and Ga is preferably at least 0.1 atomic percent, more preferably at least 0.2 atomic percent. But if the content of Al and Ga exceeds 13 atomic percent, a drop in Br is conspicuous. Furthermore, cobalt (Co) may be used as a substitute for part of the Fe, optionally. Co is effective in preventing a drop of iHc suffered from pulverization, heightening the curie temperature and enhancing corrosion resistance. If the effects of Co are to be obtained, the content of Co is preferably at least 0.1 atomic percent, more preferably at least 1.0 atomic percent. But if the content of Co exceeds 50 atomic percent, magnetic properties, such as (BH)max deteriorate. Preferably, the Co content is less than the content of Fe with respect to atomic percent.

Besides Al, Ga and Co, part of the Fe may be substituted with Cr, Ti, Zr, Hf, Nb, Ta, V, Mn, Mo, W, Cu, Ru, Rh, Re, Os, and Ir. The amount of these elements is up to 30% by weight. If the content of these elements exceeds 30% by weight, magnetic properties such as (BH)max deteriorate.

A rare earth-iron-boron magnetic alloy can be used in the form of a sintered alloy or a cast alloy.

In the present invention, the manner in which alloy powder is heat-treated is important. The method of making a magnet with a mixture of: (1) a powder of a rare earth-iron-boron magnetic sintered alloy and (2) at least one of the group consisting of R, R-oxides or R-compound will now be explained with reference to FIG. 1.

First, at step 10, a rare earth-iron-boron alloy magnetic is cast and at step 12 is pulverized, such as with a ball mill. For the purpose of facilitating forming and sintering and, at the same time, improving the magnetic properties, the alloy is preferably finely divided to an average particle diameter in the range of about 2 um to about 10 um. If the average particle diameter exceeds 10 um, the iHc possibly falls short of being sufficient. If the average particle diameter is less than 2 um, pulverization itself is difficult and the magnetic properties such as Br possibly falls short of being sufficient.

Then, at step 14, the resultant fine powder is press molded in a desired shape. The press molding step may be carried out with the particles aligned in a magnetic field on the order of 15 kOe, for example, as in the production of a conventional sintered magnet. If the press molding step is carried out with the particles magnetically aligned, the sintered magnetic alloy is magnetically anisotropic. The press molding step with the particles magnetically aligned is necessary for producing an anisotropic resin-bonded magnet, but for an isotropic resin-bonded magnet, the press molding step may be carried out in the absence of a magnetic field.

Subsequently, at step 16, the formed mass of powder is sintered at a temperature, for example, in the range of about 1000 to about 1200° C. for a period approximately in the range of 0.5 to 5 hours. The sintering step may be carried out in an inert atmosphere, such as Ar or $N_2$ gas, or under a vacuum so as to preclude the possible addition to the oxygen content of the alloy.

The sintered alloy is preferably subjected to a heat-treatment. The heat-treatment is preferably an aging treatment in the range of about 400 to about 800° C. for a period approximately in the range of 0.1 to 10 hours. If the temperature of the aging treatment is lower than 400° C. or higher than 800° C., there arises a disadvantage, for example, deterioration of the iHc or the rectangular property of the B-H hysteresis loop. When the sintered alloy comprises some amount of Al or Ga, the above aging treatment is more effective. When the sintered alloy comprises some amount of Ga, the temperature of the aging treatment is preferably in the range of about 500° C. to about 800° C.

A preliminary aging treatment, for example, in the range of about 450° C. to about 1150° C. is effective for acquiring a high iHc. When the sintered alloy comprises some amount of Al or Ga, the above preliminary aging treatment is more effective. When the sintered alloy comprises some amount of Ga, the temperature of the aging treatment is preferably in the range of about 550° C. to about 1150° C.

The above-mentioned heat-treatment may be omitted. The above-mentioned anisotropic sintered alloy may be substituted with an isotropic alloy, which is not a sintered alloy, in the following steps.

The sintered alloy is subsequently crushed at step 18 to an average particle diameter of about 10 um to 800 um. If the average particle diameter is less than 10 um, the iHc possibly falls short of being sufficient. If the average particle diameter exceeds 800 um, the resin-bonded permanent magnet is not easily produced with a prescribed density and the Br possibly falls short of being sufficient.

The resultant magnetic powder is mixed with the powder of the aforementioned R, R-oxides or R-compounds at step 20. The resultant mixture is subjected at step 22 to a heat-treatment below the melting point of the magnetic powder, such as at a temperature in the range of about 300° C. to about 1000° C. for at least 0.1 hours. Typically, the beneficial effects of heat-treatment are not significantly enhanced after 10 hours. The powder of the R, R-oxides or R-compounds is preferably desired to have an average particle diameter no more than about 100 um for the purpose of ensuring thorough dispersion of the powder in the magnetic powder. A deviation of the temperature from the specified temperature range results in a deterioration of the magnetic properties such as iHc and the rectangular property of the B-H hysteresis loop. The aforementioned mixture is preferably subjected to a preliminary heat-treatment at a temperature in the range of about 500 to 1100° C. for up to about 3 hours and typically about 1 hour to produce a high iHc magnet.

The above-mentioned effects with the R, R-oxides or R-compounds are excellent when the rare earth-iron-boron magnetic alloy comprises some amount of Co.

The produced magnetic powder is then mixed with a resin such as epoxy resin or polyamide resin at step 24 and the resultant mixture is formed in a desired shape to produce a resin-bonded permanent magnet. This formation step may be carried out under application of a magnetic field for the purpose of orientation. Such magnetic alignment is necessary for an anisotropic magnet, but for an isotropic magnet, the step may be carried out in the absence of a magnetic field.

Figure 2:
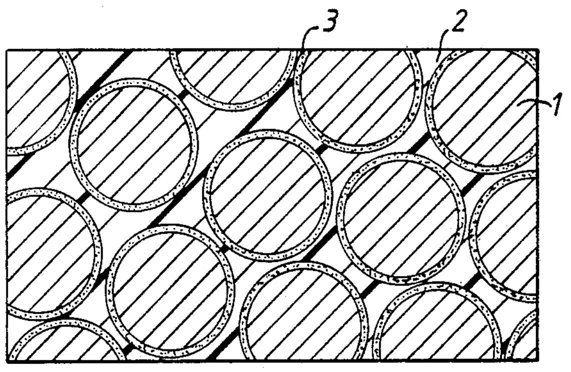
FIG. 2 shows a conceptual sectional plan view of magnetic according to this invention.

According to the aforementioned method, the state of a resin-bonded magnet is shown in FIG. 2, which shows a conceptual sectional plan. Such a resin-bonded permanent magnet includes:

(i) a rare earth-iron-boron magnetic powder (1) bonded with a resin (2); and (ii) at least one of the group of R, R-oxides and R-compounds which is homogeneously mixed with magnetic powder (1).

The rare earth-iron-boron magnetic powder may be covered with the thin layer (3) of a phase richly containing R made by the R, R-oxides or R-compound. The improvement of the magnetic properties such as the rectangular property of the B-H hysteresis loop and the coercive force may be otherwise attained by remedying defects such as strain by covering the surface of the magnetic powder with a phase richly containing R.

Figure 3:
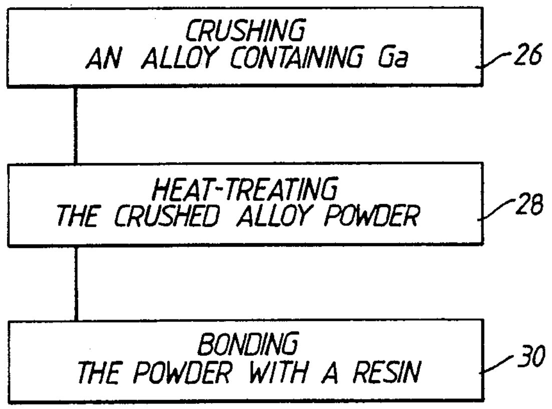
FIG. 3 shows a flowchart of an alternative embodiment of the present invention.

Alternatively, when a rare earth-iron-boron magnetic alloy comprises some amount of Ga, the iHc is not deteriorated as much after crushing the sintered alloy. Therefore, when a rare earth-iron-boron magnetic alloy comprises some amount of Ga, the following method can be used as illustrated in FIG. 3. First, at step 26, a rare earth-iron-boron magnetic alloy comprising about 8 to about 30 atomic percent of R, where R is at least one selected from the group of Y (yttrium) and rare earth elements, about 2 to about 28 atomic percent of B (boron), about 0.1 to about 13 atomic percent of Ga (gallium), and at least 50 atomic percent of Fe (iron) is crushed. At step 28, the crushed alloy is heat-treated in a manner similar to step 22 in FIG. 1. At step 30, the resultant heat-treatment powder is bonded with a resin.

Meanwhile, the magnetic alloy containing some amount of Ga or Al can be used for a resin-bonded magnet having higher iHc. The effect of Ga or Al is more effective when the magnetic alloy further comprises some amount of Co.

EXAMPLE 1-1

First, a rare earth-iron-boron magnetic casted alloy was prepared by mixing the constituent elements, Nd, Co, Al, B, and Fe in portions such that the resultant mixture had a Nd content of 15 atomic percent, a Co content of 16 atomic percent, a Al content of 4 atomic percent, a B content of 8 atomic percent, and the balance of Fe. The resultant mixture was arc melted in a water-cooled copper boat with an Ar atmosphere. The resultant casted alloy was subsequently pulverized coarsely and milled finely with a jet mill to an average particle diameter of about 3.0 um. Then the resultant fine powder was packed in a press mold and compression molded therein under a pressure of 2 tons/cm$^2$ and under application of a magnetic field of 20 kOe. The formed mass was sintered in an Ar atmosphere at 1030° C. for an hour, cooled suddenly to normal room temperature, and then crushed to an average particle diameter of 60 um, to produce a magnetic powder.

The magnetic powder was then mixed with 10% by weight of $Dy_2O_3$ powder having an average particle diameter of 25 um. The resultant mixture was subjected to a two-stage aging treatment, first at 900° C. for one hour and then at 550° C. for three hours. The resultant mixed powder was mixed with a epoxy resin, compression molded under a pressure of 12 tons/cm$^2$ under application of a magnetic field of 20 kOe, and then given a curing treatment at 120° C. for two hours, to produce an anisotropic resin-bonded magnet.

EXAMPLE 1-2

The aged mixed powder obtained by the procedure of Example 1-1 was mixed with nylon 12 (product of DuPont) and injection molded under a pressure of 1200 kg/cm$^2$ under application of a magnetic field of 10 kOe to produce an anisotropic resin-bonded magnet.

EXAMPLE 1-3

The magnetic powder obtained by the procedure of Example 1-1 was mixed with 10% by weight of $Nd_{76}Pr_2Fe_{22}$ powder having an average particle diameter of 25 um. The resultant mixture was subjected to a aging treatment at 550° C. for three hours. The resultant mixed powder was mixed with a epoxy resin, compression molded under a pressure of 12 tons/cm$^2$ under application of a magnetic field of 20 kOe, and then given a curing treatment at 120° C. for two hours, to produce an anisotropic resin-bonded magnet.

EXAMPLE 1-4

The magnetic powder obtained by the procedure of Example 1-1 was mixed with 10% by weight of $Nd_{76}Pr_2Fe_{22}$ powder having an average particle diameter of 25 um. The resultant mixture was subjected to a two-stage aging treatment, first at 900° C. for one hour and then at 550° C. for three hours. The resultant mixed powder was mixed with a epoxy resin, compression molded under a pressure of 12 tons/cm$^2$ under application of a magnetic field of 20 kOe, and then given a curing treatment at 120° C. for two hours, to produce an anisotropic resin-bonded magnet.

EXAMPLE 1-5

The aged mixed powder obtained by the procedure of Example 1-3 was mixed with nylon 12 (product of DuPont) and injection molded under a pressure of 1200 kg/cm$^2$ under application of a magnetic field of 10 kOe to produce an anisotropic resin-bonded magnet.

EXAMPLE 1-6

The magnetic powder obtained by the procedure of Example 1-1 was mixed with 5% by weight of $Dy_2O_3$ powder having an average particle diameter of 25 um and 5% by weight of $Nd_{76}Pr_2Fe_{22}$ powder having an average particle diameter of 25 um. The resultant mixture was subjected to a two-stage aging treatment, first at 900° C. for one hour and then at 550° C. for three hours. The resultant mixed powder was mixed with a epoxy resin, compression molded under a pressure of 12 tons/cm$^2$ under application of a magnetic field of 20 kOe, and then given a curing treatment of 120° C. for two hours, to produce an anisotropic resin-bonded magnet.

EXAMPLE 1-7

The aged mixed powder obtained by the procedure of Example 1-6 was mixed with nylon 12 (product of DuPont) and injection molded under a pressure of 1200 kg/cm$^2$ under application of a magnetic field of 10 kOe to produce an anisotropic resin-bonded magnet.

COMPARATIVE EXPERIMENT 1

The magnetic powder obtained by the procedure of Example 1-1 was directly subjected to a aging treatment at 550° C. for three hours. The resultant aged powder was mixed with a epoxy resin, compression molded under a pressure of 12 tons/cm$^2$ under application of a magnetic field of 20 kOe, and then given a curing treatment at 120° C. for two hours, to produce a resin-bonded magnet.

The resin-bonded magnets of Examples 1-1 to 1-7 and Comparative Experiment 1 were tested for magnetic properties. The results are shown in Table 1.

TABLE 1

| Sample No. | Residual magnetization Br (kG) | Coercive force iHc (kOe) | Maximum energy product (BH) max (MGOe) |
|---|---|---|---|
| Example | | | |
| 1-1 | 8.3 | 14.3 | 13.8 |
| 1-2 | 7.5 | 14.1 | 11.4 |
| 1-3 | 8.3 | 11.8 | 13.8 |
| 1-4 | 8.4 | 13.2 | 14.0 |
| 1-5 | 7.7 | 11.7 | 11.5 |
| 1-6 | 8.2 | 14.5 | 13.6 |
| 1-7 | 7.4 | 14.2 | 11.0 |
| Comparative Experiment | | | |
| 1 | 6.7 | 7.2 | 8.0 |

It is clearly noted from Table 1 that the resin-bonded magnets of Examples 1-1, 1-2, 1-3, 1-4, 1-5, 1-7 have more excellent magnetic properties than Comparative Experiment 1.

EXAMPLE 2

First, a rare earth-iron-boron magnetic casted alloy was prepared by mixing the constituent elements, Nd, Co, Al, B, and Fe in portions such that the resultant mixture had a Nd content of 13.5 atomic percent, a Co content of 16 atomic percent, a Al content of 2 atomic percent, a B content of 5.5 atomic percent and the balance of Fe. Then the resultant mixture was arc molded in a water-cooled copper boat enclosed with an Ar atmosphere. The resultant casted alloy was subsequently pulverized coarsely and milled finely with a jet mill to an average particle diameter of about 3.0 um. Then the resultant fine powder was packed in a press mold and compression molded therein under a pressure of 2 tons/cm$^2$ and under application of a magnetic field of 20 kOe. The formed mass was sintered in an Ar atmosphere at 1040° C. for an hour, cooled suddenly to normal room temperature, and then subjected to two stage heat-treatment consisting of a first aging treatment at 900° C. for one hour and a second aging treatment at 600° C. for one hour. The resultant aged alloy was crushed to an average particle diameter of 60 um, to produce a magnetic powder.

The magnetic powder was then mixed with 10% by weight of $Dy_2O_3$ powder having an average particle diameter of 25 um. The resultant mixture was subjected to a two-stage aging treatment, first at 900° C. for one hour and then at 600° C. for three hours. The resultant mixed powder was mixed with a epoxy resin, compression molded under a pressure of 12 tons/cm$^2$ under application of a magnetic field of 20 KOe, and then given a curing treatment at 120° C. for two hours, to produce an anisotropic resin-bonded magnet.

COMPARATIVE EXPERIMENT 2

The magnetic powder obtained by the procedure of Example 2 was directly subjected to a aging treatment at 600° C. for one hour. The resultant aged powder was mixed with a epoxy resin, compression molded under a pressure of 12 tons/cm$^2$ under application of a magnetic field of 20 kOe, and then given a curing treatment at 120° C. for two hours, to produce a resin-bonded magnet.

The resin-bonded magnets of Example 2 and Comparative Experiment 2 were tested for magnetic properties. The results are shown in Table 2.

TABLE 2

| Sample No. | Residual magnetization Br (kG) | Coercive force iHc (kOe) | Maximum energy product (BH) max (MGOe) |
|---|---|---|---|
| Example | | | |
| 2 | 9.0 | 12.1 | 17.1 |
| Comparative Experiment | | | |
| 2 | 7.0 | 6.1 | 8.9 |

It is clearly noted from Table 2 that the resin-bonded magnet of Example 2 has more excellent magnetic properties than Comparative Experiment 2.

EXAMPLE 3-1 to 3-36

The sintered alloys having compositions indicated in Table 3 to 5, were obtained by the procedure of Example 1-1 and then pulverized each to an average particle diameter of 60 um, to produce magnetic powders. These magnetic powders were mixed with a varying R, R-oxides or R-compound having an average particle diameter of 25 um. The resultant mixture was subjected to a two-stage aging treatment. The resultant mixed powders were mixed with a epoxy resin, compression molded under a pressure of 8 tons/cm$^2$ under application of a magnetic field of 20 kOe, and then given a curing treatment at 120° C. for two hours, to produce anisotropic resin-bonded magnets.

The resin-bonded magnets of Examples 3-1 to 3-36 were tested for magnetic properties. The results are shown in Tables 3 to 5. In these Tables the numerals in parentheses represent the amount of the R, R-oxide or R-compound incorporated, as expressed by % by weight.

In the aforementioned examples which are not mixed with R-oxides, the mixtures were crushed again after a heat-treatment, when the need arises.

TABLE 3

| Example | Composition of magnet alloy | R-oxide | Residual magnetic flux density, (Br) (kG) | Coercive force (iHc) (kOe) | Maximum energy product ($BH_{max}$) (MGOe) |
|---|---|---|---|---|---|
| 3-1 | $Nd_{17}B_8Fe_{75}$ | $Dy_2O_3$ (5) | 8.7 | 12.2 | 15.1 |
| 3-2 | $Nd_{12}Dy_1Ce_1Pr_2B_7Fe_{77}$ | $Dy_2O_3$ (2) | 8.8 | 12.5 | 15.5 |
| 3-3 | $Pr_{10}Nd_4Tb_1B_8Fe_{77}$ | $Tb_4O_7$ (4) | 8.6 | 12.8 | 14.8 |
| 3-4 | $Nd_{14}Pr_1B_8Co_{10}Al_3Fe_{64}$ | $Dy_2O_3$ (2)<br>$Tb_4O_7$ (2) | 8.5 | 14.1 | 14.4 |
| 3-5 | $Nd_{15}Dy_1B_7Co_7Al_2Si_1Fe_{67}$ | $Dy_2O_3$ (3)<br>$Nd_2O_3$ (1) | 8.4 | 13.8 | 14.1 |
| 3-6 | $Nd_{15}B_8Co_{16}Ga_1Al_2Fe_{58}$ | $Tb_4O_7$ (3)<br>$CeO_2$ (0.5) | 8.5 | 13.2 | 14.1 |
| 3-7 | $Nd_{14}Dy_1La_1Y_1B_8Al_3Fe_{72}$ | $Dy_2O_3$ (5)<br>$Pr_6O_{11}$ (0.3) | 8.3 | 12.9 | 13.8 |
| 3-8 | $ND_{15}Tb_1B_7Co_{14}Zr_1Ti_1Fe_{61}$ | $Er_2O_3$ (2)<br>$Sm_2O_3$ (0.5) | 8.7 | 12.1 | 15.1 |
| 3-9 | $Nd_{16}B_7Co_{14}Ni_2Cu_1Al_3Fe_{57}$ | $Dy_2O_3$ (3)<br>$Eu_2O_3$ (1) | 8.5 | 13.2 | 14.4 |
| 3-10 | $Nd_{20}B_8Co_{16}Ga_1Si_2Fe_{53}$ | $Tb_4O_7$ (4)<br>$La_2O_3$ (0.2) | 8.3 | 14.5 | 13.7 |
| 3-11 | $Nd_{16}B_7Co_5Al_3Fe_{69}$ | $Dy_2O_3$ (5)<br>$Nd_2O_3$ (0.4) | 8.4 | 13.8 | 14.0 |

TABLE 4

| Example | Composition of magnet alloy | R or R compound | Residual magnetic flux density, (Br) (kG) | Coercive force (iHc) (kOe) | Maximum energy product ($BH_{max}$) (MGOe) |
|---|---|---|---|---|---|
| 3-12 | $Nd_{16}B_8Fe_{76}$ | $Nd_{76}Pr_2Fe_{22}$ (10) | 8.8 | 10.2 | 15.5 |
| 3-13 | $Nd_{14}Dy_2Fe_{77}$ | $Nd_{76}Pr_2Fe_{22}$ (7) | 8.6 | 14.2 | 14.8 |
| 3-14 | $Nd_{15}B_8Co_{16}Ga_1Fe_{60}$ | $Nd_{76}Pr_2Fe_{22}$ (5) | 8.7 | 12.0 | 15.1 |
| 3-15 | $Nd_{14}Pr_2B_8Co_{10}Al_3Fe_{63}$ | $Nd_{87}Pr_2Fe_{10}Mo_{0.5}Al_{0.5}$ (7) | 8.6 | 12.3 | 14.5 |
| 3-16 | $Pr_{13}Dy_2B_8Cu_2Fe_{75}$ | Nd (3) | 8.6 | 13.1 | 14.3 |
| 3-17 | $Nd_{13}Ce_1Dy_1B_8Co_7Fe_{70}$ | $Nd_{95}Fe_5$ (5) | 8.4 | 13.7 | 14.1 |
| 3-18 | $Nd_{15}B_7Al_2Fe_{76}$ | $Dy_{95}Fe_5$ (4) | 8.7 | 12.1 | 15.0 |
| 3-19 | $Nd_{14}Tb_1B_7Co_{10}Fe_{68}$ | $Tb_{50}Co_{50}$ (20) | 8.2 | 13.8 | 13.5 |
| 3-20 | $Nd_{13}Pr_1Dy_1B_7Ti_2Fe_{66}$ | $Nd_{11}Pr_{77}Fe_{10}Ni_1Al_1$ (3) | 8.7 | 12.0 | 15.1 |
| 3-21 | $Nd_{16}B_8Co_{10}Si_1Zr_2Fe_{63}$ | $Dy_{80}Fe_{15}Mn_5$ (5) | 8.5 | 11.1 | 14.0 |
| 3-22 | $Nd_{15}B_7Fe_{78}$ | $Nd_{88}Pr_2Fe_{10}$ (10) | 8.9 | 10.4 | 15.8 |
| 3-23 | $Nd_{12}Pr_2B_7Al_2Fe_{77}$ | $Dy_{15}Tb_{15}Fe_{70}$ (13) | 8.5 | 12.8 | 14.5 |
| 3-24 | $Nd_{14}Dy_1B_8Co_{10}Ga_1Fe_{66}$ | $Nd_{50}Pr_{20}Ce_5La_5Fe_{18}Ca_1Zr_1$ (10) | 8.5 | 13.2 | 14.4 |
| 3-25 | $Nd_{15}B_8Fe_{75}Al_2$ | Mm Misch metal (5) | 8.4 | 12.9 | 14.1 |

TABLE 5

| Example | Composition of magnet alloy | R-oxide and R or R compound* | Residual magnetic flux density, (Br) (kG) | Coercive force (iHc) (kOe) | Maximum energy product ($BH_{max}$) (MGOe) |
|---|---|---|---|---|---|
| 3-26 | $Nd_{17}B_8Fe_{75}$ | $Dy_2O_3$(3), $Nd_{76}Pr_2Fe_{22}$ (4) | 8.7 | 11.3 | 16.0 |
| 3-27 | $Nd_{13}Dy_1Pr_1B_7Fe_{78}$ | $Tb_4O_7$ (2), $Nd_{78}Ce_2Fe_{10}Co_5Ni_5$ (5) | 8.5 | 14.2 | 15.4 |
| 3-28 | $Nd_{12}Ce_1Pr_1Tb_2B_7Co_7Fe_{70}$ | $Dy_2O_3$ (5)<br>$Nd_2O_3$ (0.5), $Tb_{50}Co_{50}$ (3) | 8.4 | 13.3 | 15.0 |

TABLE 5-continued

| Example | Composition of magnet alloy | R-oxide and R or R compound* | Residual magnetic flux density, (Br) (kG) | Coercive force (iHc) (kOe) | Maximum energy product ($BH_{max}$) (MGOe) |
|---|---|---|---|---|---|
| 3-29 | $Pr_{10}Nd_2Dy_2La_1B_7Al_2Fe_{76}$ | $Tb_4O_7$ (3)<br>$CeO_2$ (0.1), Nd (2) | 8.5 | 12.9 | 15.2 |
| 3-30 | $Nd_{14}Dy_1B_6Co_7Ga_1Fe_{71}$ | $Dy_2O_3$ (4), $Nd_{10}Pr_{60}La_1Ce_2Fe_{20}Mn_5Ni_5$ (4) | 8.8 | 13.2 | 16.3 |
| 3-31 | $Nd_{17}B_7Co_7Ni_2Al_3Fe_{64}$ | $Tb_4O_7$ (5)<br>$Pr_6O_{11}$ (0.3), $Nd_{76}Pr_2Fe_{22}$ (7) | 8.6 | 13.4 | 15.7 |
| 3-32 | $Nd_{15}B_8Co_5Cu_1Ti_2C_1Fe_{68}$ | $Dy_2O_3$ (4)<br>$Nd_2O_3$ (0.2), $Nd_{30}Co_{40}Fe_{22}Zr_2Ca_5Al_1$ (10) | 8.2 | 12.8 | 13.8 |
| 3-33 | $Nd_{13}Dy_1Pr_1B_7Ni_3Al_2Fe_{70}$ | $Dy_2O_3$ (3)<br>$La_2O_3$ (5), $Pr_{70}Ce_2Dy_7La_1Fe_{15}Ce_5$ (8) | 8.6 | 13.3 | 15.6 |
| 3-34 | $Nd_{16}B_8Co_{10}Hf_1Nb_2Ga_1Fe_{62}$ | $Tb_4O_7$ (4)<br>$Er_2O_3$ (2), $Nd_{60}Tb_{20}Fe_{15}Mo_3Cu_2$ (5) | 8.5 | 13.1 | 15.2 |
| 3-35 | $Nd_{15}B_7Co_{20}Ga_1Al_2Fe_{55}$ | $Dy_2O_3$ (3)<br>$Gd_2O_3$ (1), MM Misch metal (7) | 8.5 | 12.8 | 15.2 |
| 3-36 | $Nd_{15}B_8Co_{15}Ga_1Al_3Fe_{58}$ | $Dy_2O_3$ (4), $Nd_{76}Pr_2Fe_{22}$ (5) | 8.6 | 14.2 | 15.5 |

EXAMPLE 4-1

In a water-cooled steel boat placed in an atmosphere of argon, a blend consisting essentially of 14.5 atomic percent of Nd, 16 atomic percent of Co, 1 atomic percent of Ga, 10.5 atomic percent of B, and the balance of Fe was arc melted. The resultant magnetic alloy was subsequently pulverized coarsely in the Ar atmosphere and milled finely with a jet mill to an average particle diameter of about 3.0 um.

Then the resultant fine powder was packed in a prescribed press mold and compression molded therein under a pressure of 2 tons/cm$^2$ and under application of a magnetic field of 20 kOe. The formed mass was sintered in the Ar atmosphere at 1060° C. for an hour. The sintered alloy was crushed to an average particle diameter of 200 um. Then the resultant aged powder was given an aging treatment under a vacuum at 600° C. for five hours, and cooled suddenly to normal room temperature. The resultant powder was mixed with an epoxy resin, compression molded under a pressure of 12 tons/cm$^2$ under application of a magnetic field of 20 kOe, and then given a curing treatment at 120° C. for two hours, to produce an anisotropic resin-bonded magnet.

EXAMPLE 4-2

A resin-bonded magnet was produced by the same method of Example 4-1, excepting a preliminary aging treatment was performed at 900° C. for one hour before the aging treatment at 600 C.

EXAMPLE 4-3

A resin-bonded magnet was produced by the same method of Example 4-1, excepting thermoplastic nylon 12 was used in place of the epoxy resin and the mixture was injection molded under a pressure of 1200 kg/cm$^2$ under application of a magnetic field of 10 kOe instead of being compression molded.

The magnetic properties of Example 4-1 to 4-3 are shown in Table 6.

TABLE 6

| Sample No. | Residual magnetization Br (kG) | Coercive force iHc (kOe) | Maximum energy product (BH)max (MGOe) |
|---|---|---|---|
| Example | | | |
| 4-1 | 8.4 | 12.8 | 15.3 |
| 4-2 | 8.6 | 14.5 | 16.1 |

TABLE 6-continued

| Sample No. | Residual magnetization Br (kG) | Coercive force iHc (kOe) | Maximum energy product (BH)max (MGOe) |
|---|---|---|---|
| 4-3 | 7.4 | 12.8 | 11.9 |

It is clearly noted from Table 6 that the resin-bonded magnets of Example 4-1 to 4-3 have excellent magnetic properties.

EXAMPLE 4-4

In a water-cooled steel boat placed in an atmosphere of argon, a blend consisting essentially of 15.5 atomic percent of Nd, 1 atomic percent of Ga, 7.5 atomic percent of B, and the balance of Fe was arc melted. The resultant magnetic alloy was subsequently pulverized coarsely in the Ar atmosphere and milled finely with a jet mill to an average particle diameter of about 3.0 um.

Then the resultant fine powder was packed in a prescribed press mold and compression molded therein under a pressure of 2 tons/cm$^2$ and under application of a magnetic field of 20 kOe. The formed mass was sintered in the Ar atmosphere at 1060° C. for an hour. The sintered alloy was crushed to an average particle diameter of 200 um. Then the resultant aged powder was subjected to a heat treatment consisting of a first-stage aging treatment under a vacuum at 900° C. for one hour and a second-stage aging treatment under a vacuum at 600° C. for five hours. The resultant powder was mixed with an epoxy resin, compression molded under a pressure of 12 tons/cm$^2$ under application of a magnetic field of 20 kOe, and then given a curing treatment at 150° C. for two hours, to produce an anisotropic resin-bonded magnet.

The resultant resin-bonded magnet exhibited 8.7 kG of Br, 11.2 kOe of iHc, and 16.7 MGOe of (BH)max.

EXAMPLE 4-5

A resin-bonded magnet was produced by the same method of Example 4-4, excepting a blend consisting essentially of 14.5 atomic percent of Nd, 16 atomic percent of Co, 1 atomic percent of Ga, 8.5 atomic percent of B, and the balance of Fe was used.

The resultant resin-bonded magnet exhibited 8.7 kG of Br, 12.6 kOe of iHc, and 16.5 MGOe of (BH)max.

Although a number of embodiments have been described in detail above, the those skilled will appreciate that many modifications are possible in the described embodiments without materially departing from the novel teachings and advantages of this invention. Accordingly, all such modifications are intended to be included in this invention as defined by the following claims.

What is claimed is:

1. A resin-bonded rare earth-iron-boron magnet comprising:

a non-melt spun heat-treated powder resulting from heat treating, below its melting point, a mixture of:

(1) a rare earth-iron-boron magnetic alloy powder comprising about 8 to about 30 atomic percent of R wherein R is at least one selected from the group of Y(yttrium) and rare earth elements, about 2 to about 28 atomic percent of B(boron), and at least 50 atomic percent of Fe(iron), and (2) at least one of the group of R, R-oxides and R-compounds which is homogeneously mixed with the magnetic alloy powder, wherein the R content of the R-compounds content is at least 30 atomic percent and said heat-treated powder is composed of particles covered by an R rich phase, and resin binding said heat-treated powder.

2. A resin-bonded rare earth-iron-boron magnet according to claim 1, wherein the R-compounds consist essentially of more than 30 atomic percent of R and the balance substantially of at least one of Fe and Co.

3. A resin-bonded rare earth-iron-boron magnet according to claim 2, wherein the rare earth-iron-boron magnetic alloy further includes Co in an atomic percentage less than that of Fe.

4. A resin-bonded rare earth-iron-boron magnet according to claim 3, wherein the rare earth-iron-boron magnetic alloy further includes about 0.1 to about 13 atomic percent of at least one of the group of Al and Ga.

5. A resin-bonded rare earth-iron-boron magnet produced by the process of:

(a) subjecting a non-melt spun powder to a heat-treatment below its melting point, wherein the powder comprises one of:

(a-1) a mixture of: (1) a powder of a rare earth-iron-boron magnetic alloy comprising about 8 to about 30 atomic percent of R, wherein R is at least one selected from the group consisting of Y(yttrium) and rare earth elements, about 2 to about 28 atomic percent of B(boron), and at least 50 atomic percent of Fe(iron) and (2) at least one of the group consisting of R, R-oxides, which are oxides of R, and R-compound, which are the compounds consisting essentially of more than 30 atomic percent of R and the balance substantially of at least one of Fe and Co; and (a-2) a rare earth-iron-boron magnetic alloy comprising about 8 to about 30 atomic percent of R, about 2 to about 28 atomic percent of B, about 0.1 to about 13 atomic percent of Ga, and at least 50 atomic percent of Fe;

wherein particles of the heat treated powder are covered by an R rich phase; and (b) bonding the resultant heat-treated powder with a resin.

6. A magnet according to claim 5, wherein the heat-treatment subjecting process occurs at a temperature in the range of about 300° C. to about 1000° C.

7. A magnet according to claim 6, wherein said heat-treatment subjecting process includes a preliminary heat-treatment step at a temperature in the range of about 500 to 1100° C. is subjected, and than a heat-treatment step at a temperature in the range of about 300° C. to about 1000° C.

8. A magnet according to claim 5, wherein the rare earth-iron-boron magnetic alloy further includes Co.

9. A magnet according to claim 8, wherein the content of Co is less than the content of Fe in the rare earth-iron-boron magnetic alloy.

10. A magnet according to claim 5, wherein the rare earth-iron-boron magnetic alloy further includes at least one of Al and Ga.

11. A magnet according to claim 10, wherein the content of Ga and Al is in the range of about 0.1 to about 13 atomic percent.

12. A magnet according to claim 10, wherein the rare earth-iron-boron magnetic alloy further includes Co.

13. A magnet according to claim 12, wherein the content of Co is less than the content of Fe in the rare earth-iron-boron magnetic alloy with respect to atomic percent.

14. A magnet according to claim 5, wherein the rare earth-iron-boron magnetic alloy is a sintered alloy.

15. A magnet according to claim 14, wherein the sintered alloy is subjected to a heat-treatment at a temperature in the range of about 400° C. to about 800° C., and then crushed into said powder.

16. A magnet according to claim 15, wherein said heat-treatment subjecting process includes a preliminary heat-treatment at a temperature in the range of about 450° C. to about 1150° C., and then a heat-treatment at a temperature in the range of about 400° C. to about 800° C.

17. A magnet according to claim 14, wherein the sintered alloy is magnetically anisotropic.

18. A magnet according to claim 5, wherein the content of the R, R-oxides and R-compounds is from about 0.1% to about 30% by weight based on the rare earth-iron-boron magnetic alloy powder.

19. A magnet according to claim 5, wherein the powder subjected to said heat-treatment process includes a mixture of the powder of said rare earth-iron-boron magnetic alloy, R-oxides and at least one of the group consisting of R and R-compound.

* * * * *